(12) United States Patent
Henderson et al.

(10) Patent No.: US 12,254,620 B2
(45) Date of Patent: Mar. 18, 2025

(54) REPLACEMENT PART VALIDATION SYSTEMS AND METHODS

(71) Applicant: 3M INNOVATIVE PROPERTIES COMPANY, St. Paul, MN (US)

(72) Inventors: John W. Henderson, St. Paul, MN (US); Michael E. O'Brien, White Bear Lake, MN (US); Esther S. Jeong, St. Paul, MN (US); Matthew D. Moore, Lake Elmo, MN (US); Andrew W. Long, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 471 days.

(21) Appl. No.: 17/821,482

(22) Filed: Aug. 23, 2022

(65) Prior Publication Data

US 2023/0060289 A1    Mar. 2, 2023

Related U.S. Application Data

(60) Provisional application No. 63/260,638, filed on Aug. 27, 2021.

(51) Int. Cl.
  *G06Q 10/20* (2023.01)
  *G06T 7/00* (2017.01)
  *G06V 10/74* (2022.01)

(52) U.S. Cl.
  CPC ............ *G06T 7/001* (2013.01); *G06Q 10/20* (2013.01); *G06V 10/761* (2022.01);
  (Continued)

(58) Field of Classification Search
  CPC .......... G06T 7/001; G06T 2207/30108; G06T 2207/30248; G06Q 10/20; G06V 10/761; G06V 2201/08; G06V 10/764
  See application file for complete search history.

(56) References Cited

U.S. PATENT DOCUMENTS

| | | |
|---|---|---|
| 9,071,749 B2 | 6/2015 | Hwang et al. |
| 9,370,799 B2 | 6/2016 | Nygaard et al. |
| 9,539,619 B2 | 1/2017 | Kujacznski et al. |

(Continued)

FOREIGN PATENT DOCUMENTS

| | | |
|---|---|---|
| FR | 3038094 A1 | 12/2016 |
| KR | 100529404 B1 | 11/2005 |

(Continued)

OTHER PUBLICATIONS

Arikan, "Surface Defect Classification in Real-Time Using Convolutional Neural Networks", Apr. 2019, [retrieved from the internet on Oct. 12, 2022], URL <https://arxiv.org/abs/1904.04671>, 16 pages.

(Continued)

*Primary Examiner* — Charlotte M Baker
(74) *Attorney, Agent, or Firm* — Katherine M. Scholz; Philip P. Soo

(57) ABSTRACT

A replacement part validation system is presented that includes a scanning system that scans a received part and provides the scan results of the received part. The system also includes a part recognition module that, based on the received scan results of the received part and provides a part identification and a part quality metric. The system also includes a job assignment module that assigns the received part to an outstanding repair job. The system also includes an output generator that outputs the outstanding repair job and the part quality metric. The system also includes a computing processor that, based on the received scanned results, causes the part recognition module to review a database of parts and retrieve a most-likely match. The part quality metric is based on a comparison of the received part to the most-likely match. The computing processor causes the output generator to output the outstanding repair job and part quality metric to a source.

20 Claims, 9 Drawing Sheets

(52) U.S. Cl.
CPC ............... *G06T 2207/30108* (2013.01); *G06T 2207/30248* (2013.01); *G06V 2201/08* (2022.01)

(56) References Cited

U.S. PATENT DOCUMENTS

| | | | |
|---|---|---|---|
| 2012/0029759 A1 | 2/2012 | Suh et al. | |
| 2014/0201022 A1* | 7/2014 | Balzer | G06T 7/0002 705/26.4 |
| 2020/0269820 A1* | 8/2020 | Lin | B21D 1/12 |
| 2020/0311647 A1* | 10/2020 | Seshadri | G06Q 10/103 |

FOREIGN PATENT DOCUMENTS

| | | |
|---|---|---|
| KR | 100573039 B1 | 4/2006 |
| TW | 326049 B | 6/2010 |

OTHER PUBLICATIONS

Caulier, New Structured Illumination Technique for the Inspection of High-Reflective Surfaces: Application for the Detection of Structural Defects without any Calibration Procedures, EURASIP Journal on Image and Video Processing, vol. 2008, Article ID 237459, 14 pages.

Kammel, "Deflectometric Measurement of Specular Surfaces", IEEE Transactions on Instrumentation and Measurement, Apr. 2008, vol. 57, No. 4, pp. 763-769.

Kim, "Classification of Steel Surface Defect Using Convolutional Neural Network with Few Images", 2019 12th Asian Control Conference (ASCC), Jun. 2019, pp. 1398-1401.

Konovalenko, "Steel Surface Defect Classification Using Deep Residual Neural Network", Metals 2020, vol. 10, No. 6, pp. 846(1)-846(15).

* cited by examiner

REPLACEMENT PART VALIDATION SYSTEMS AND METHODS

BACKGROUND

Many vehicles such as cars, trucks, boats and planes require replacement parts during their lifetime, either due to part failure or damage. The repair industry deals with large volumes of new and used parts during vehicle repair. Within the collision repair industry, complex repairs are done everyday within repair facilities. When incorrect, damaged, or faulty parts or materials are delivered, the repair process is put on hold until the correct parts and materials are available.

SUMMARY

A replacement part validation system is presented that includes a scanning system that scans a received part and provides the scan results of the received part. The system also includes a part recognition module that, based on the received scan results of the received part and provides a part identification and a part quality metric. The system also includes a job assignment module that assigns the received part to an outstanding repair job. The system also includes an output generator that outputs the outstanding repair job and the part quality metric. The system also includes a computing processor that, based on the received scanned results, causes the part recognition module to review a database of parts and retrieve a most-likely match. The part quality metric is based on a comparison of the received part to the most-likely match. The computing processor causes the output generator to output the outstanding repair job and part quality metric to a source.

BRIEF DESCRIPTION OF THE DRAWINGS

The disclosure may be more completely understood in consideration of the following detailed description of various embodiments of the disclosure in connection with the accompanying figures, in which.

Figure 1:
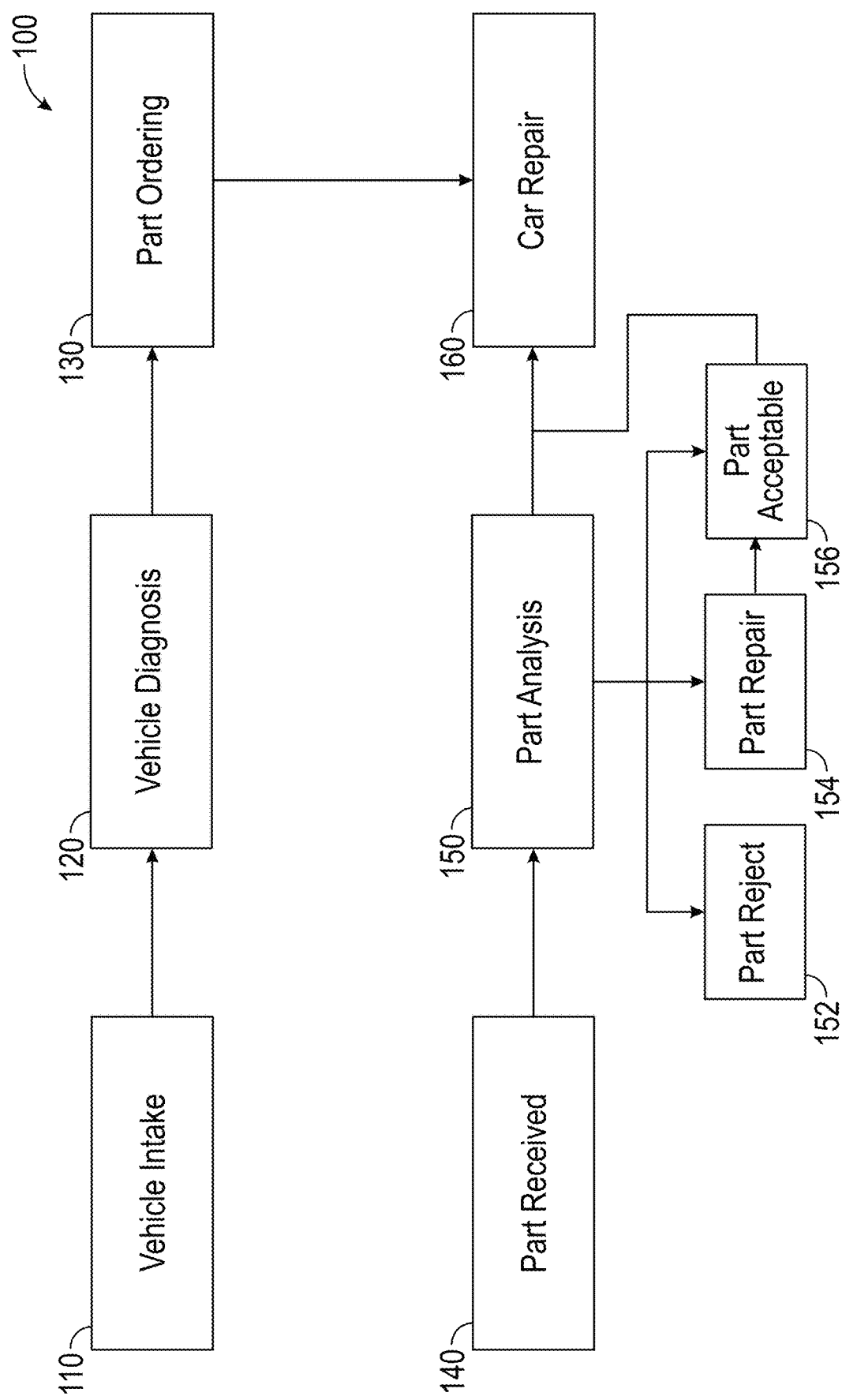
FIG. 1 is a schematic of a vehicle part replacement process in which embodiments herein may be useful.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides systems and methods for identifying, validating and determining quality of replacement parts for the collision repair industry. Within the collision repair industry, complex repairs are done everyday within repair facilities. When incorrect, damaged, or faulty parts or materials are delivered, the repair process is put on hold until the correct parts and materials are available. A system to check for the correct parts and materials to accomplish a repair would eliminate this delay. While systems and methods herein are described with respect to the automotive repair industry, it is expressly contemplated that some embodiments herein may apply to other vehicle repair industries, such as airplane repair, helicopter repair, ship repair, etc.

Autobody shops order replacement parts at a high rate in the process of repairing vehicles damaged in collisions. Incorrect or parts damaged upon arrival are a source of inefficiency, slowdown, and waste in the process. During the course of a repair, autobody shops will order a whole range of products involved in repairing a vehicle. These range from mechanical parts (replacement radiators, fluid reservoirs, etc.) to body panels (bumper covers, doors, etc.), glass (windows/windshields), and consumables (body filler, adhesive, etc.). Due to the phases of repair and dependencies on previous operations, there are often many vehicles in progress within a given shop, all at various stages, and waiting for a previous step, technician availability, or arrival of components/products.

One challenge observed in shops and mentioned by technicians is that of validating and inspecting replacement parts. Human error both in ordering by the technician and order filling by the supplier, as well as pre-existing or shipping-induced damage may cause the part to be inadequate to use in a repair, thus requiring the shop to either wait another cycle of order filling and shipping time to proceed with a newly delivered part, or take the time and materials to repair the damaged part. Similarly, the delay also affects the consumer wait time for their vehicle to be repaired, potentially causing issues between the consumer and the repair shop, and increasing costs for providing a rental car during repairs. A computer vision system that could validate and inspect parts for damage upon receipt would reduce delays in discovering these issues, which cause returns/exchanges, and therefore further delays in the process.

FIG. 1 is a schematic of a vehicle part replacement process in which embodiments herein may be useful. When an individual brings a vehicle into an autobody repair shop, a process 100 is initiated. During vehicle intake 110, the individual's information is taken down and the information about the vehicle, e.g. the suspected problems or issues are cataloged. During a vehicle diagnosis 120, an estimator, technician, or mechanic determines what particular issues are causing the identified problems and whether replacement parts are needed to fix the issue. If a vehicle part needs to be replaced, replacement parts are ordered 130. Replacement parts may be in stock in some cases, in others an order for new parts must be made. In such cases, it is important to receive the replacement parts in good condition so that the car repair 160 can take place.

Parts are received 140, in some embodiments, in response to an order placement 130. The order placement 130 may be a special order, for example in response to a particular vehicle diagnosis 120. However, in some embodiments, parts are received, in block 140, without a particular repair in mind. For example, parts received 140 may be parts that are frequently needed and expected for upcoming repairs.

Once parts are received 140, they have to be analyzed 150 and validated. For example, in some cases a received part does not match an ordered part, such as brakes for the wrong vehicle make or model. In another example, parts that arrive may be deficient in some manner, for example missing a component, or they may be unsuitable for immediate use, such as a bent axel or a dented replacement door. Since many parts are supplied from secondhand sources, it is possible that parts may be bent, damaged, rusted, or dirty. Some parts may be able to be repaired on-site and made useable. However, an auto repair company may decide to return the unsuitable parts instead. Based on the analysis 150, a part may be rejected 152 as completely unsuitable and needing to be returned to a supplier. The part may also be determined to be repairable 154, and sent to an area of the facility for repair, or the part may be determined to be acceptable 156.

Once all needed parts for a repair operation are available, a car repair 160 can start.

It is desired to have a system that can streamline and improve the part analysis step 150. For example, if a system can identify a received part 140 and determine (1) if the received part is the ordered part, (2) whether the received part is suitable for a job and (3) assign the received part to a job ID associated with a specific car repair 160, time might be saved in the overall process from vehicle intake 110 to completed car repair 160. Systems and methods herein use sensors to detect received parts 140, provide analysis regarding part acceptability, and indicate when a car repair 160 can be completed.

Systems and methods herein reduce downtime waiting for parts to arrive, potentially catching mismatches or existing damage sooner and may be able to allow for shops to track which vendors frequently provide unacceptable parts, or which vendors infrequently provide unacceptable products.

Systems and methods herein may also assist in building a database of images of parts from multiple angles and in multiple states of cleanliness, rustiness, and use, providing more datapoints for better recognition of parts and better analysis of future parts.

Using sensors, such as optical sensors, laser sensors, weight sensors, etc., a received part can be identified and analyzed. For example, as described herein, a camera, or other suitable optical sensors, images a received part. In some embodiments, a camera also obtains images of an old part during the ordering procedure. Such images may be useful both for identifying an incoming part and for verifying consistency between the newly-arrived part and the part needing replacement. The part receiving area of a vehicle repair shop may have a separate camera setup such that the interaction between a technician and a receiver is not necessary. Captured images may be sufficient, in some embodiments, to link a year/make/model/or part number to a received part. In other embodiments, at least some input may be needed by a technician.

Systems and methods herein provide additional value in avoided errors and increased speed in identifying parts needing repair or replacement. Initially, the step of imaging a part may take additional time, but as the system increases a repository of part images, the system will become better at identifying part details. An overall repair time for autobody shops with systems and methods herein may be reduced because parts are more consistently ready to be used in a repair, and unsuitable parts are more rapidly replaced.

Additionally, it may be easier for vehicle repair shops to return damaged or incorrect parts as documentation is often not difficult to obtain if the part was received days or weeks previously. A system or method that images the part during unboxing of a received part may be useful during a return process. For example, car doors are easily dented and are difficult to ship. It is valuable to both the repair shop and a supplier to have better insight into what is causing dents such that damaged parts are not shipped back and forth.

Figure 2:
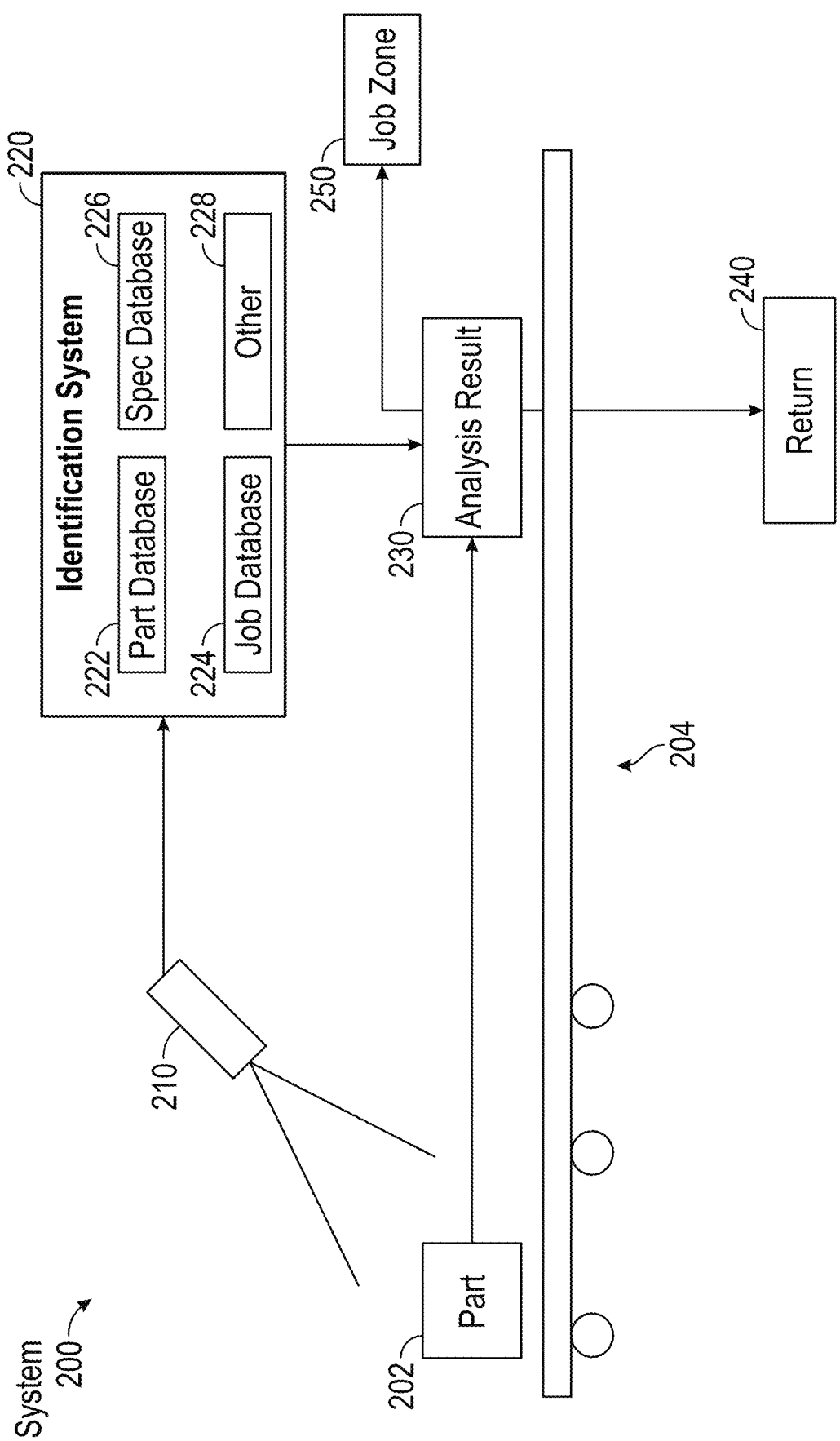
FIG. 2 is a schematic of a system for analyzing received vehicle parts in accordance with embodiments herein.

FIG. 2 is a schematic of a system for analyzing received vehicle parts in accordance with embodiments herein. System 200 may be useful for identifying and analyzing the quality of a received part at a vehicle repair shop. A part 202 is received and placed within system 200, for example on a movement mechanism such as a conveyor belt 204. Part 202 may be opened in view of a camera 210, or may be opened elsewhere before entering a view of camera 210. Camera 210 may have an accompanying light source, or may be used without a separate light source, in some embodiments. Camera 210 is illustrated as a single optical sensor, however it is expressly contemplated that, in some embodiments, optical sensor 210 is an array of sensors, such as cameras, lasers, scattered light beam generators or other mechanisms for identifying a type or quality of part 202.

In some embodiments, an identity of part 202 is provided to system 200, such as an axle for a 2005 Ford Taurus. In other embodiments, only a basic part ID, such as "axle" or "truck axle" is provided. In other embodiments, no identifying information is provided.

Optical sensor 210 may provide sensory information to an identification system 220. Identification system 220 may, using the received sensory information, identify part 202 by comparing it to part database 222. A quality of the part may be evaluated by comparing to specification database 226. For example, part 202 may be dirty, which is easily rectified by cleaning. However, part 202 may be rusty, which may not be acceptable for parts that will be on a portion of a vehicle visible to its owner. For example, a car door must be free of rust or dents. Specification database may include information concerning a level or type of defect that is acceptable. For example, a bent axle may be acceptable, but require repair prior to part 202 being used in a job. Some dents may be easily removed, while others are difficult to remove without retaining some cosmetic damage or requiring excessive additional work such as repainting. Identification system 220 also includes a job database 224 of active repair jobs and parts required for each active repair job. Part 202 may be assigned to a job based on a part identification, from parts database 222 and any repair needed, from specification database 226. Identification system 220 may provide or house other information 228, such as vendor or insurance company information, replacement part availability and cost, or other information.

Identification system outputs an analysis result 230 for part 202. Analysis result 230 may cause part 202 to be routed to job zone 250, where a repair will be conducted, e.g. a garage or other repair area. Analysis result 230 may also route part 202 to be returned 240, e.g. back to a mailing area of an office. Before being sent to a job zone 250, a part 202 may be cleaned, treated or repaired. Part 202 may be physically transported to job zone 250 or a return area 240 by movement mechanism 204.

Figure 3:
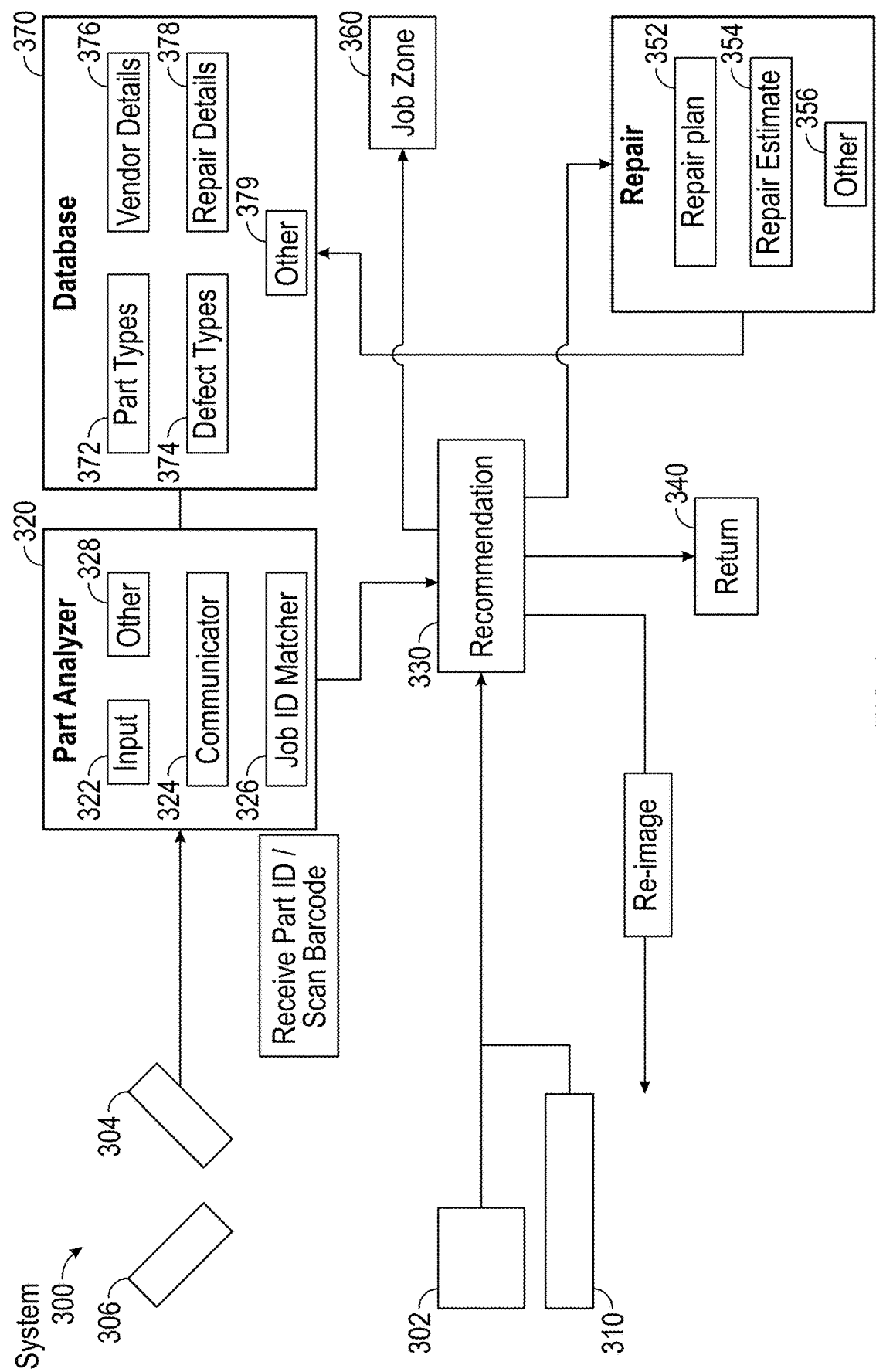
FIG. 3 is a schematic of another system for analyzing received vehicle parts in accordance with embodiments herein.

FIG. 3 is a schematic of another system for analyzing received vehicle parts in accordance with embodiments herein. System 300 analyzes received parts and determines whether the parts can be used for a current repair job, can be repaired to a satisfactory condition, or needs to be returned.

A part 302 is received at a station 310. Station 310 may be a mobile station or stationary. Station 310 may be where part 302 is initially unboxed, or part 302 may be placed on station 310 after unboxing. A technician may input information into system 300 at unboxing, such as the part type, and what vehicle make/model it should be used for. Station 310 may include one or more sensors to help identify part 302 or determine a quality of part 302. For example, station 310 may include a scale which may estimate a weight of part 302. Station 310 may also provide a fiducial such that optical sensor 304 can estimate dimensions of part 302. Optical sensor 304 may be a black and white camera, an RBG camera, a 3D scanner, a depth camera, a surface mapping tool, a structured light sensor, a deformation image correlation (DIC), a laser, or another suitable sensor. A light source 306 may provide illumination.

Information from sensor 304 and/or station 310 is provided to part analyzer 320. Part analyzer 320 may receive input through an input mechanism 322. In some embodiments, a technician may provide information such as a part ID, a job ID for the part, a make or model of a vehicle associated with the part. Part analyzer 320 receives information from a database 370. Database 370 may include information on part types 372, such as part specifications and associated vehicle make and models. Part types 372 may include 3D models of parts, such as CAD models or other details that analyzer 320 can use to identify part 302. Part types 372 may also include images of parts, captured by system 300 or another system, to which images from sensor 304 can be compared. Database 370 may also include known information about defects 374 that may be present on part 302. Defect information 374 may include specifications regarding what types of defects can be repaired on-site, and whether such defects need to be repaired at all. For example, a part that is intended for an internal position within a vehicle may not need to be repaired so long as it has sufficient structural integrity. Some defects may be repairable, such as minor dents, dirt that can be cleaned, or rust that can be removed.

Based on a part identification, a job ID matcher 326 may associate part 302 with a repair job. Part analyzer 320 may also include other features 328.

Part analyzer also includes a communicator 324. Based on detected defects in part 302, part analyzer may communicate a recommendation 330 that a part be returned 340 (e.g. because the part is the wrong part or because the part does not meet quality standards) or repaired 350. If no defects are found that require repair, then the part may proceed to a job zone 360 with a job ID.

A decision to repair a part or return a part may be based on a number of factors. Communicator 324 may also be able to communicate externally with a vendor to obtain vendor part details 376, such as an available inventory of replacement parts and source data for replacement parts. For example, a replacement part may be available but from a less reputable seller. Vendor part detail 376 may also include turnaround time for a new part to be delivered, and/or a proximity to the repair shop.

A decision to return or repair a part may also be based on estimates concerning the repair, including a repair plan and an estimated time to repair. Communicator 324 may provide recommendation 330, along with a repair plan 352 and estimate 354, either directly to a customer or to an insurance company, who may need to provide approval before the repair 350 or a return 340 is authorized. An insurance company may prefer to authorize the costs of a repair 350, for example, rather than wait additional time for a new part to arrive, as they may be responsible for providing a rental car in the interim. Communicator 324 may facilitate more rapid communication of recommendation 330 to a customer, which may reduce overall repair time required. Repair information provided to a customer by communicator 324 may also include other information 356, such as images of part 302, identified detects, or other information helpful to making a decision to move forward. Communicator 324 may automatically provide recommendation 330 and repair information to a customer when a repair 350 is recommended. Repair details 378 may also be sent to database 370.

Database 370 may also include other information 379. For example, actual repair times may be recorded such that future repair plans 352 and repair estimates 354 may be more accurate. Additionally, quality control may improve for both a repair shop using system 300 and vendors providing parts, as it may be helpful in narrowing down where damage to parts is being caused. For example, dents may be caused by a particular package technique or delivery service.

For a recommendation 330 of a part return 340, part analyzer may also provide a return form for a technician with relevant information already filled out. In embodiments where a part 302 is partially or completely unwrapped on station 310, vendor information, such as a shipping address, may already be captured and used to fill out a return form.

Figure 4:
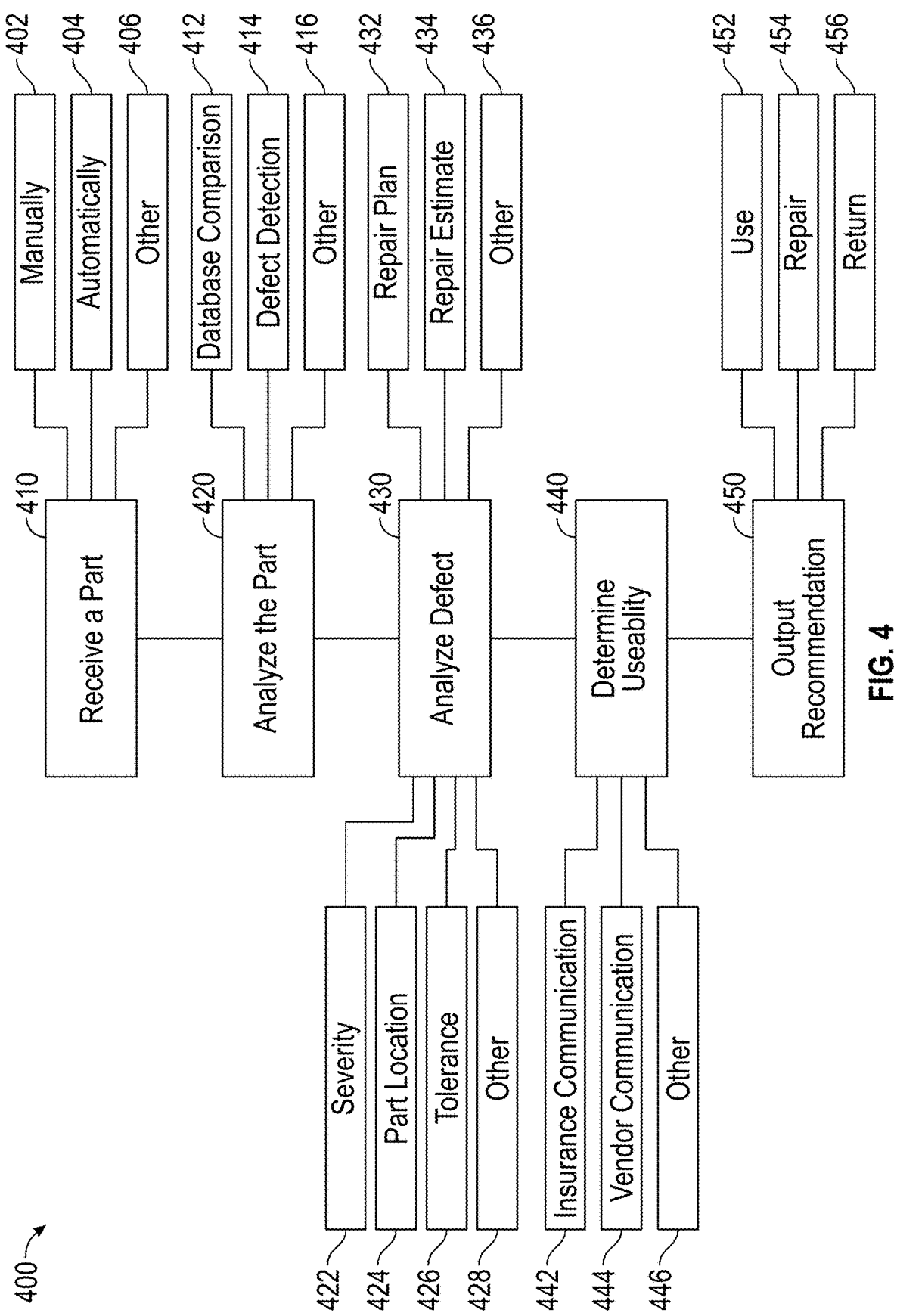
FIG. 4 illustrates a method of determining suitability of a potential replacement part in accordance with embodiments herein.

FIG. 4 illustrates a method of determining suitability of a potential replacement part in accordance with embodiments herein. Method 400 may be implemented by a system with an optical sensor capable of capturing images of a received part.

In block 410, a part is received. In some embodiments, a part is received and processed manually, as indicated in block 402. In some embodiments, the part is received and at least partially processed automatically, as indicated in block 404. For example, the part may be automatically imaged during an unboxing when placed on an imaging station. The part may be automatically identified, for example by an optical scanner detecting and reading a barcode. In other embodiments, at least part of the process is done manually, and part automatically, as indicated in block 406. For example, post-unboxing a technician may manually enter a part ID or initiate scanning by an optical sensor.

In block 420, the received part is analyzed. The analysis may be done based on information received from one or more optical sensors that capture information about the part using known machine vision system, such as the system described in *A flexible machine vision system for small part inspection based on a hybrid SVM.ANN approach*, by Joshi et al., *Journal of Intelligent Manufacturing*. Other machine vision systems are also expressly contemplated. However, other known systems may be used, such as appearance machine vision, or a matching system as described in Bai et al. *Semantic Part Detection via Matching: Learning to Generalize to Novel Viewpoints from Limited Training Data,* 13 Sep. 2019. The optical sensor may, in some embodiments, be a camera or camera system, such as a pan/tilt camera, a 360° view camera system, etc. Based on received information from the optical sensor or camera, a part is identified by comparison to a database of parts, as indicated in block 412. Identifying a part may include identifying a type of part, e.g. an axle or a passenger side door, as well as identifying a make/model for the vehicle associated with the part. E.g. an axle for a 2005 Toyota® Corolla or a passenger side door for a 2013 Honda® Civic. Analyzing the part may also include searching for defects, as indicated in block 414, such as a bend in an axle, a dent or rust on a passenger side door. Analyzing the part may also include detecting other information, as indicated in block 416, such as the passenger side door having alabaster silver metallic colored paint, as opposed to a polished metal metallic colored paint.

In block 430, any detected defects are analyzed. Defects may include punctures, holes, dents, discoloring, rust, etc. If multiple defects are detected, such as both a dent and rust on a passenger side door, method 400 may cycle between steps 420 and 430 for each detected defect, in some embodiments. In other embodiments method 400 only proceeds to step 430 when all defects are identified, and each defect is analyzed sequentially or in parallel. Defect analysis may include, for example, rust defect recognition methods such as the *Automated steel bridge coating rust defect recognition method based on color and texture feature*, by Shen et al., published in Automation in Construction, Volume 31, May 2013, pages 338-356. Other rust detection methods using machine learning may also be used. Similarly, other defects may be detected using known machine learning techniques. Deflectometry may be used to find small defects as well as to characterize dents in specular surfaces. Paint defects may be detected using known vision-system techniques, for example as described in *An Efficient Automotive Paint Defect Detection System*, Akhtar et al., in ASTES Journal v. 4, No. 3, 171-182 (2019).

Each defect is analyzed to determine whether the part needs repair prior to use in a job. The defect is analyzed for severity 422, location 424 of the defect as well as location of the part on a vehicle, a defect tolerance 426, and potentially other features 428. For example, a defect that is not severe, such as a minor dent, for a part that is in a less visible area of a vehicle (e.g. the undercarriage), may not need to be repaired as long as it is within an accepted quality tolerance of the repair shop and/or an insurance company that needs to approve the repair. In contrast, any dent in a door or hood of a car, regardless of the severity, may need to be repaired in order to meet aesthetic tolerance requirements. Similarly, a damaged driveshaft, no matter how severe, may be rejected because of safety/function tolerance. Tolerances may be set by a repair shop or an OEM and may be based on safety, function or aesthetic. Tolerances may also be set by insurance companies, which may allow used parts for some vehicle functions, but require new parts for others.

Defect analysis may also include estimating whether or not the defect can be feasibly repaired. While it may be possible to repair any defect that does not affect structural integrity, it may not be economically feasible for the repair shop or the customer. For example, an insurance company may prefer to pay for repair of the part because it will result in a repair being completed more quickly, and will save the insurance company money in fewer days that a rental vehicle needs to be provided to the vehicle owner. Therefore, a repair plan 432 may be prepared, along with a repair estimate 434. Other information 436 may also be prepared, such as images of the part to send to an insurance company. A repair plan 432 may indicate steps that must be taken to repair the part. For example, rust may need to be removed and then new paint applied. A repair estimate may indicate the cost for each step, and any materials needed, to complete the repair, such as time estimated to remove the rust, based on the amount of rust detected, time estimated to paint the part, and the cost of the paint and abrasive materials required.

The analysis of steps 420 and 430 are done automatically, in some embodiments, such that once the part is received and imaged, it is analyzed for defects and the defects are, in turn, analyzed for repairability.

In block 440, based on the defects detected and the estimated time/cost to repair the part to a useable state, the part is determined as useable or not. Useability may also include communicating with an insurance company, indicated in block 442, or a vendor 444. For example, it may be determined, based on vendor communication 444, that it will take 2 weeks to return and receive a replacement part, or even longer if the needed part is on backorder or unavailable. Such information may change a recommendation from return to repair, as it may be preferrable to take 1-2 days to repair a part than require a vehicle owner to wait 2 weeks plus the time to repair their vehicle. Other information 446 may be considered, such as the reliability of a vendor or the distance a part must travel to be received by the shop.

In some embodiments, step 440 may automatically proceed after 430, such that an insurance company is automatically consulted for approval of a potential repair plan before a recommendation is provided to a technician at a repair shop.

In block 450, a recommendation is output to a technician. The recommendation may be that the part is useable as-is 452, needs to be repaired 454 prior to use, or needs to be returned 456.

FIG. 4 illustrates an embodiment where a recommendation is provided after communication with external sources. However, it is expressly contemplated that, in some embodiments, the order of blocks 440 and 450 are opposite that illustrated in FIG. 4, such that the recommendation is provided to a technician prior to being provided to the insurance company or a vendor for comment/approval. This may be particularly helpful when a system is first installed to quality check repair plans and estimates.

Figure 5:
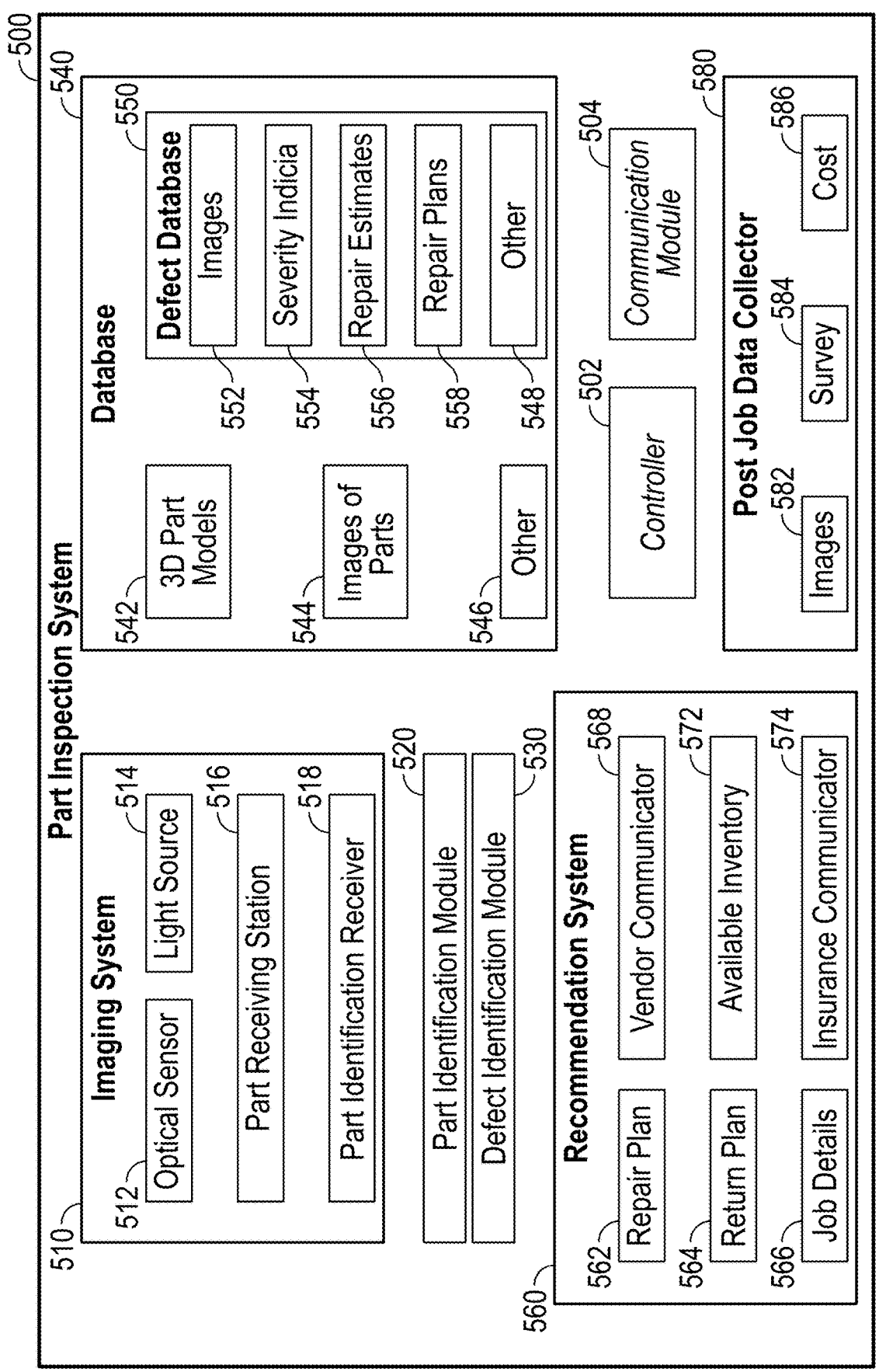
FIG. 5 illustrates a block diagram of a part inspection system in accordance with embodiments herein.

FIG. 5 illustrates a block diagram of a part inspection system in accordance with embodiments herein. Part inspection system 500 may be located in a vehicle repair shop and may increase processing efficiency for newly received parts, decreasing repair time experienced by customers and downtime experienced by the repair shop.

An imaging system 510 is positioned at a part receiving station 516. Imaging system 510 captures information about a part on part receiving station 516. Any suitable imaging system 510 may be used, such as the KEYENCE LumiTrax Processing system. A part identification receiver 518, in some embodiments, receives information about a part on part receiving station 516. For example, a technician may manually enter a part ID, or part identification receiver may read a barcode or packaging information provided from a vendor and imaged during unwrapping of the part. Imaging system 510 may have an optical sensor 512 that scans or images a part on part receiving station 516. A light source 514 may provide illumination, if needed. Imaging system 510 may also have other sensors or components that can aid in identifying a part. for example, part receiving station 516 may incorporate a scale that can detect a weight of a part.

Part identification module 520 receives scan, image or sensor information from imaging system 510. The received identifying information is then compared against information in database 540. For example, an OEM may provide 3D part models 542, or images of parts 544. Images of parts 544 may also include images of previously received parts, for example, in a clean or dirty state. Other information 546 that may be used to identify parts may also used by part identification module 520 to identify a received part.

A defect identification module 530 may also analyze images or scan information from imaging system 510. Defect identification module 530 may operate in series after, or in parallel with, part identification module 520. Defect identification module 530 may compare information about the received part with defect database 550. Images 552 of defects may include previously imaged defects by system 500, or otherwise provided to database 540. A defect may be identified as a puncture, a dent, a scratch, a hole, rust or a structural or functional issue such as the part being bent, clogged, or otherwise not suitable for its intended function. Once detected, a defect may be compared against severity indicia 554 to determine whether it can or needs to be repaired prior to use. For example, parts used in non-visible areas (e.g. undercarriage or in the engine) may have small amounts of rust, dents or punctures and still be acceptable for use. However, parts in visible areas have to meet aesthetic requirements for use. Similarly, functionally critical parts may need to be structurally sound in order to be used in a repair.

Defect identification module 530 may output a score or metric relative to the part. The score or metric may be used to classify the part as repairable or not, or may be used to determine priority of part repair if more than one part needs to be repaired. Defect identification module 530 may output one weighted score, or a number of scores, indicative of, for example, severity as a function of location (e.g. chassis scoring higher than a door panel), a size of a defect, location on a part, etc. The scoring elements may be weighted based on relative importance to each factor and combined as a weighted sum or other functional form. The metric may be used directly, in one embodiment, e.g. where a result above a certain number dictates that the part be returned immediately. In other embodiments, if a subscore is higher than a threshold, it may be returned immediately, regardless of the total metric score.

If defect identification module 530 identifies a defect that can be repaired, then a repair plan may be generated, for example based on historic repair plans 558, which may include time estimates and material requirements, and may assist in the generation of an associated repair estimate 556 for the repair plan. Defect database 550 may store other information 548 as well.

Part inspection system 500 may also include a recommendation system 560. Recommendation system may output a recommendation to use the part as-is, if no defects are detected or the defects are not severe enough to require repair. Alternatively, recommendation system 560 may recommend that the part be repaired or returned to the vendor. Recommendation system 560 may provide, with a repair recommendation, a repair plan 562 for the part, based on repair plans 558 and repair estimates 556 from database 550. Alternatively, if a return recommendation is provided, a return plan 564 may be provided, for example with a return form of a particular vendor that a technician can submit. Recommendation system 560 may prefill out the return form based on information captured by imaging system 510, or retrieved from available vendor information, such as shipping address, part information, images from the unboxing process, etc.

The decision to repair or return a part may depend, in part, on availability of replacement parts. Recommendation system 560 may use a vendor communicator 568 to contact one or more vendors to determine whether replacement parts are available, location of the replacement parts, turnaround time for replacement parts, etc. If it is not possible to get a timely replacement part, repair may be preferred to timely complete a vehicle repair job. Recommendation system 560 may check available inventory 572 of replacement parts proximate the repair center as well, for example checking a number of nearby vendors for availability and cost. Recommendation system 560 may communicate with one or more vendors, using vendor communicator 568, to determine part availability, cost and turnaround time.

Similarly, the decision to repair or return may not be solely at the discretion of a repair shop. Customer approval or an insurance company, may be a consideration with regard to what parts are used and whether a repair plan, and additional costs, are authorized. An insurance communicator 574 may automatically send a communication to the customer or insurance company, providing repair plan 562 with an authorization request. Automating the communication process may increase the speed at which a repair plan 562 or return plan 564 is authorized. Job details 566 for an eventual repair may also be provided to a customer, for example using communication module 504.

Controller 502 controls operation of imaging system 510, part identification module 520, defect identification module 530, recommendation system 560, communication module 504, and post job data collector 580. Controller 502 may, for example, trigger part identification module 520 automatically when a part is detected on part receiving station 516, for example by a sensor in part receiving station 516, by optical sensor 512, or in response to a manual indication by a technician. Controller 502 may trigger defect identification module 530 automatically, either in response to a part identification by identification module 530, or automatically in parallel with part identification module 520. As used herein, "in parallel" refers to part identification and defect identification processes at least partially overlapping.

Communication module 504 may facilitate part inspection system 500 communicating with other systems, for example through wireless or wired communication networks, Bluetooth®, through a cloud-based distributed network, etc. Communication module 504 may facilitate function of vendor communication 568 or insurance communicator 574.

Post job data collector 580 may be triggered by a recommendation from recommendation system 560 either being accepted, amended, or rejected by a technician. Post job data collector 580 may collect images 582 from optical sensor 512, as well as any sensor data from other sensors of part inspection system 500. Post job data collector 580 may also present a survey 584 or otherwise gain information that can be added to database 540 such that part identification module 520 and defect identification module can provide more accurate information, and so that recommendation system 560 can provide more appropriate recommendations. For example, survey 584 may request confirmation that the part and any defects were correctly identified and that defect severity was correct. Similarly, survey 584 may collect actual cost information 586 for any part repair, and may request information as to whether repair estimates or plans were correct.

Figure 6:
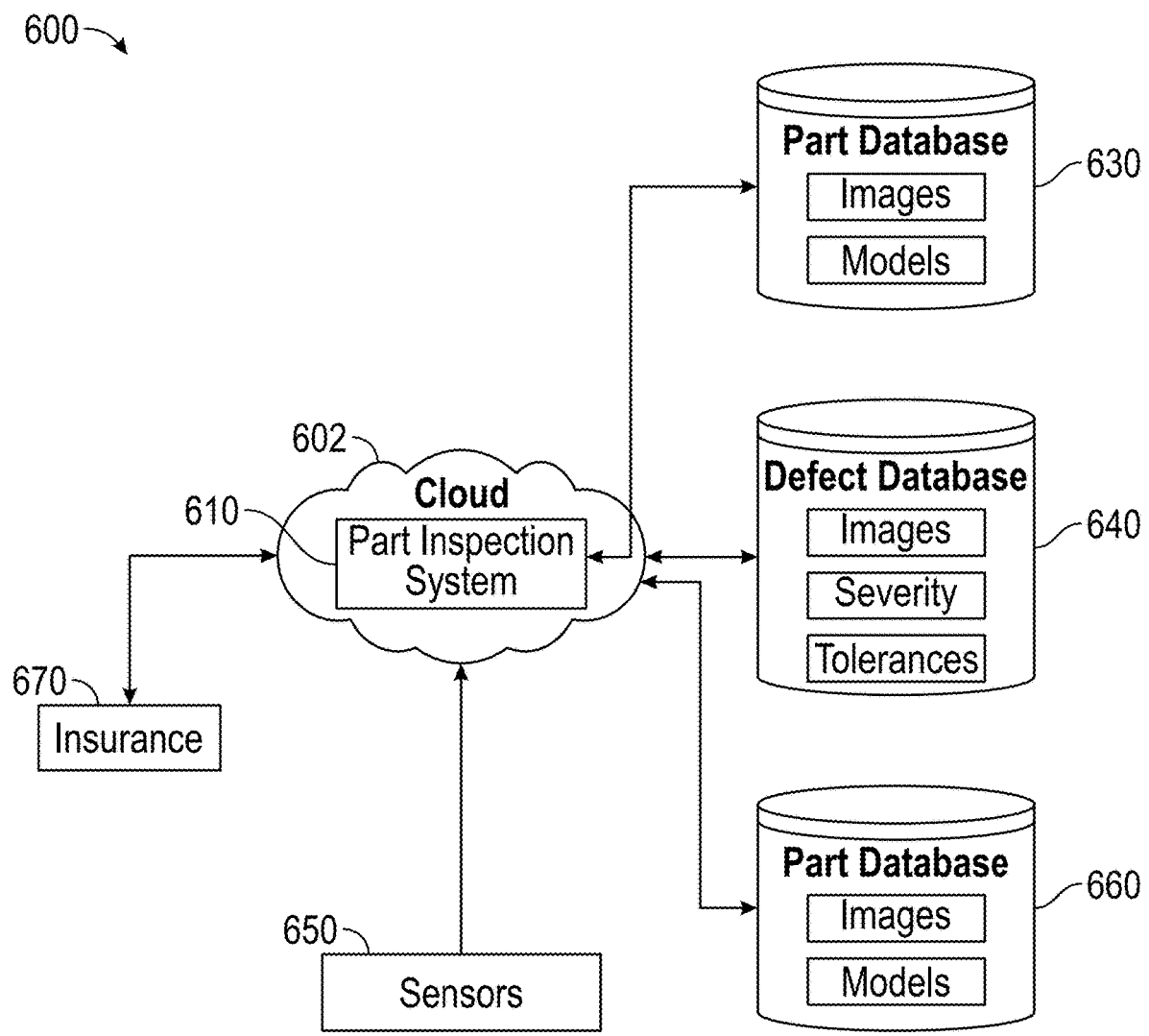
FIG. 6 is a block diagram of a cloud-based part inspection system architecture.

FIG. 6 is a block diagram of a cloud-based part inspection system architecture. The remote server architecture 600 illustrates one embodiment of an implementation of part inspection system 610. FIG. 5 illustrates one embodiment where part inspection system is a local system. However, it may improve part identification and defect identification modules to have access to as wide array of data as possible. Therefore, a parts database 830 may be accessed through a cloud-based network such that more images collected of parts from more repair ships are available to improve accuracy of part identification and defect identification modules.

Remote server architecture 600 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 6, some items are similar to those shown in earlier figures. FIG. 6 specifically shows that a nose foam template system can be located at a remote server location 802. Therefore, a technician using computing device 620 accesses those systems through remote server location 602. A technician can use computing device 620 to access user interfaces 622 as well. For example, a technician may enter FIG. 6 shows that it is also contemplated that some elements of systems described herein are disposed at remote server location 602 while others are not. By way of example, storage 630, 640 or 660 or sensors 650 can be disposed at a location separate from location 602 and accessed through the remote server at location 602. Regardless of where they are located, they can be accessed directly by computing device 620, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. This may allow a user 650 to interact with system 610 through their computing device 620, to order a nose foam template (either fully or semi-customized) for delivery or pickup.

It will also be noted that the elements of systems described herein, or portions of them, can be disposed on a wide variety of different devices. Some of those devices include servers, desktop computers, laptop computers, imbedded computer, industrial controllers, tablet computers, or other mobile devices, such as palm top computers, cell phones, smart phones, multimedia players, personal digital assistants, etc.

Figure 7:
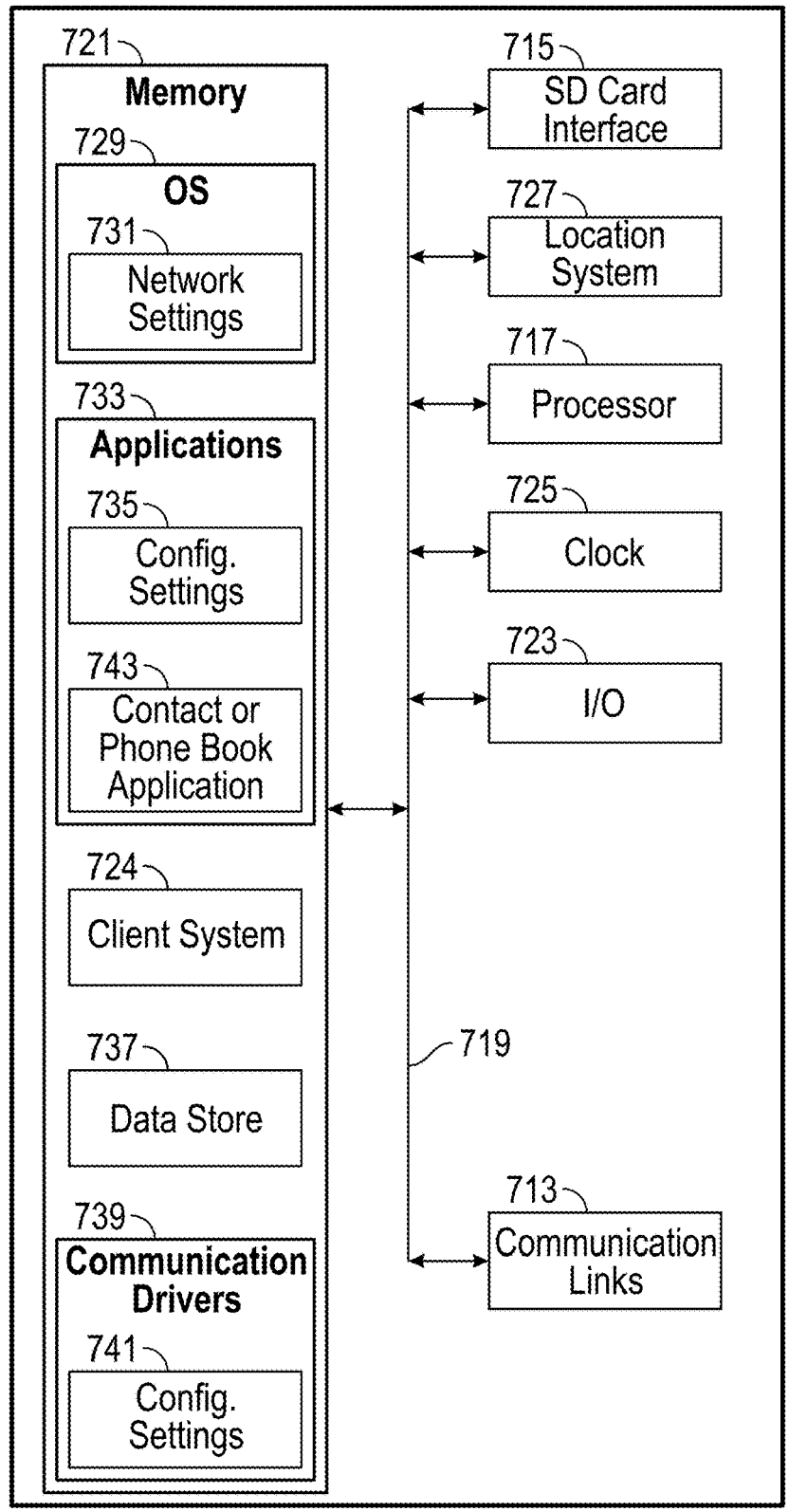
FIGS. 7-9 illustrates an example computing systems that may be used in accordance with embodiments herein.
Figure 8:
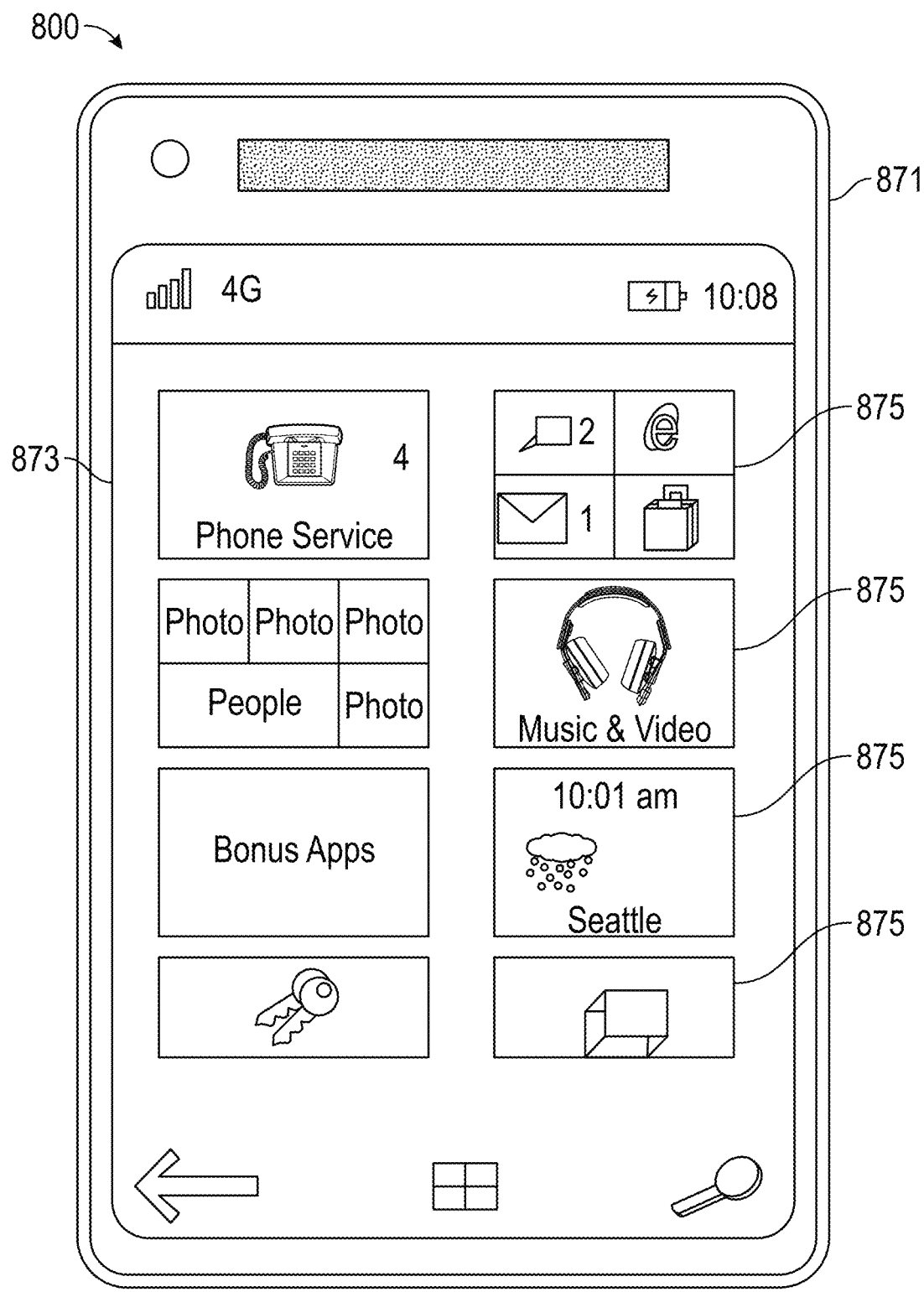
Figure 9:
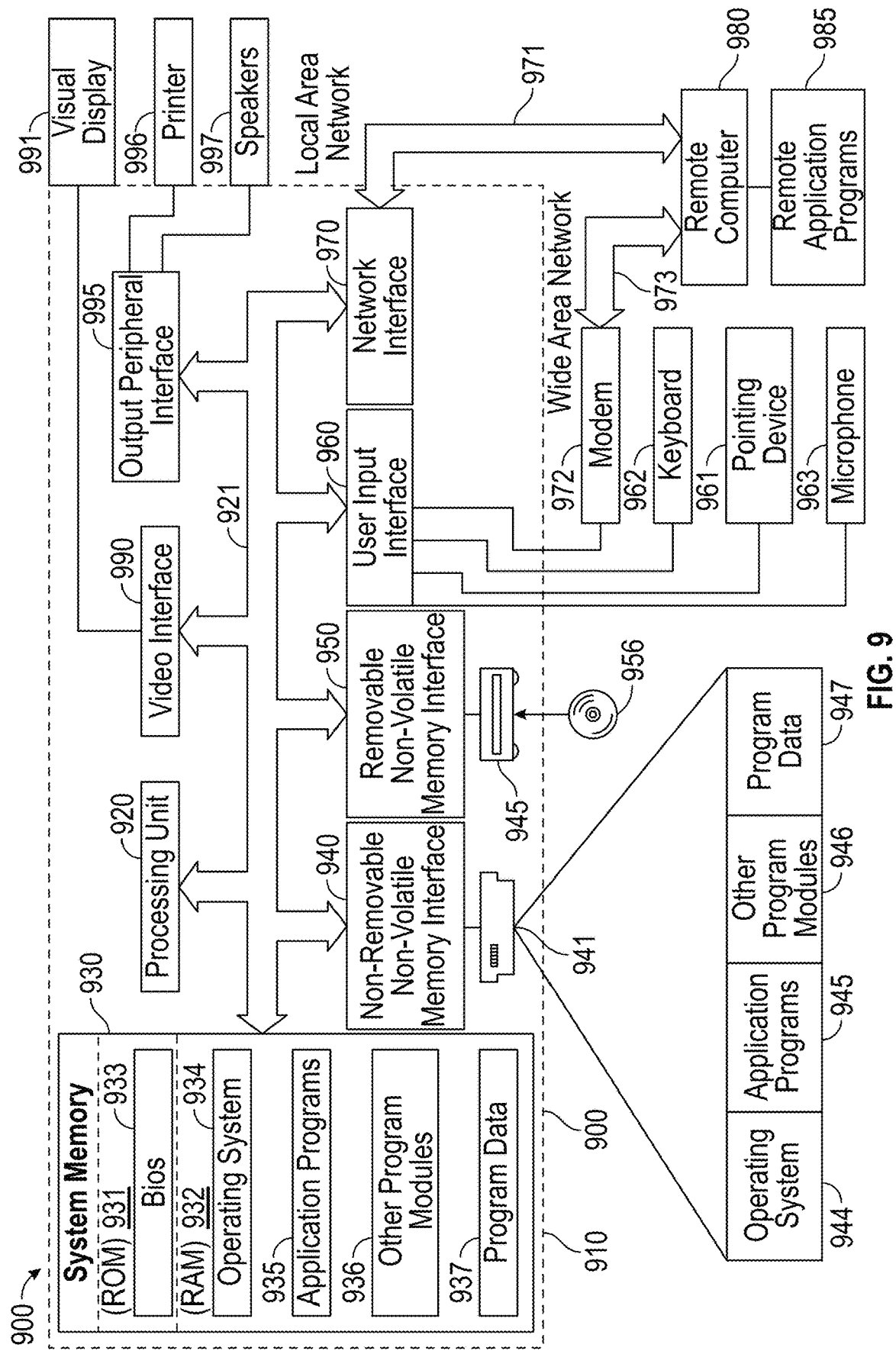

FIGS. 7-9 illustrates an example computing systems that may be used in accordance with embodiments herein.

FIG. 7 is a simplified block diagram of one illustrative example of a handheld or mobile computing device that can be used as a user's or client's handheld device 716, in which the present system (or parts of it) can be deployed. For instance, a mobile device can be deployed in the operator compartment of parameter set generator 600 for use in generating, processing, or displaying the data. FIG. 8 is another example of a handheld or mobile device.

FIG. 7 provides a general block diagram of the components of a client device 716 that can run some components shown and described herein. Client device 716 interacts with them, or runs some and interacts with some. In the device 716, a communications link 713 is provided that allows the handheld device to communicate with other computing devices and under some embodiments provides a channel for receiving information automatically, such as by scanning. Examples of communications link 713 include allowing communication though one or more communication protocols, such as wireless services used to provide cellular access to a network, as well as protocols that provide local wireless connections to networks.

In other examples, applications can be received on a removable Secure Digital (SD) card that is connected to an interface 715. Interface 715 and communication links 713 communicate with a processor 717 (which can also embody a processor) along a bus 719 that is also connected to memory 721 and input/output (I/O) components 723, as well as clock 725 and location system 727.

I/O components 723, in one embodiment, are provided to facilitate input and output operations and the device 916 can include input components such as buttons, touch sensors, optical sensors, microphones, touch screens, proximity sensors, accelerometers, orientation sensors and output components such as a display device, a speaker, and or a printer port. Other I/O components 723 can be used as well.

Clock 725 illustratively comprises a real time clock component that outputs a time and date. It can also provide timing functions for processor 717.

Illustratively, location system 727 includes a component that outputs a current geographical location of device 716. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 721 stores operating system 729, network settings 731, applications 733, application configuration settings 735, data store 737, communication drivers 739, and communication configuration settings 741. Memory 721 can include all types of tangible volatile and non-volatile computer-readable memory devices. It can also include computer storage media (described below). Memory 721 stores computer readable instructions that, when executed by processor 717, cause the processor to perform computer-implemented steps or functions according to the instructions. Processor 717 can be activated by other components to facilitate their functionality as well.

FIG. 8 shows that the device can be a smart phone 871. Smart phone 871 has a touch sensitive display 873 that displays icons or tiles or other user input mechanisms 875. Mechanisms 875 can be used by a user to run applications, make calls, perform data transfer operations, etc. In general, smart phone 871 is built on a mobile operating system and offers more advanced computing capability and connectivity than a feature phone.

Note that other forms of the devices 816 are possible.

FIG. 9 is a block diagram of a computing environment that can be used in embodiments shown in previous Figures.

FIG. 9 is one example of a computing environment in which elements of systems and methods described herein, or parts of them (for example), can be deployed. With reference to FIG. 9, an example system for implementing some embodiments includes a general-purpose computing device in the form of a computer 910. Components of computer 910 may include, but are not limited to, a processing unit 920 (which can comprise a processor), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to systems and methods described herein can be deployed in corresponding portions of FIG. 9.

Computer 910 typically includes a variety of computer readable media. Computer readable media can be any available media that can be accessed by computer 910 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random-access memory (RAM) 932. A basic input/output system 933 (BIOS) containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 1134, application programs 935, other program modules 936, and program data 937.

The computer 910 may also include other removable/non-removable and volatile/nonvolatile computer storage media. By way of example only, FIG. 9 illustrates a hard disk drive 941 that reads from or writes to non-removable, nonvolatile magnetic media, nonvolatile magnetic disk 952, an optical disk drive 955, and nonvolatile optical disk 956. The hard disk drive 941 is typically connected to the system bus 921 through a non-removable memory interface such as interface 940, and optical disk drive 955 are typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 1144, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite receiver, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections, such as a Local Area Network (LAN) or Wide Area Network (WAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 1173, such as the Internet. In a networked environment, program modules may be stored in a remote memory storage device. FIG. 9 illustrates, for example, that remote application programs 985 can reside on remote computer 980.

A replacement part validation system is presented that includes a scanning system that scans a received part and provides the scan results of the received part. The system also includes a part recognition module that, based on the received scan results of the received part and provides a part identification and a part quality metric. The system also includes a job assignment module that assigns the received part to an outstanding repair job. The system also includes an output generator that outputs the outstanding repair job and the part quality metric. The system also includes a computing processor that, based on the received scanned results, causes the part recognition module to review a database of parts and retrieve a most-likely match. The part quality metric is based on a comparison of the received part to the most-likely match. The computing processor causes the output generator to output the outstanding repair job and part quality metric to a source.

The system may also include a defect detection module that, based on the received scan results, detects a defect. The detected defect is output as the part quality metric.

The system may be implemented such that the defect is a bend, a puncture, a hole, a dent, a discoloration, rust, or dirt.

The system may be implemented such that the defect detection module compares the defect to severity factors.

The system may be implemented such that the severity factors include part location, defect location, defect type, defect size, or part function.

The system may be implemented such that a repair plan is generated for the part based on the detected defect.

The system may be implemented such that a repair estimate is generated based on the repair plan.

The system may be implemented such that the part quality metric is a return recommendation. The return recommendation is based on the repair plan having a repair time greater than a threshold repair time or a repair cost greater than a threshold repair cost.

The system may be implemented such that the part quality metric is a repair recommendation. The return recommendation is based on the repair plan having a repair time less than a threshold repair time.

The system may be implemented such that the part quality metric is a return recommendation based on the comparison to the severity factors.

The system may be implemented such that the part is scanned while on a part receiving station.

The system may be implemented such that the part receiving station is a mobile receiving station.

The system may be implemented such that the mobile receiving station is a conveyor belt.

The system may be implemented such that the scans include images captured by a camera system.

The system may be implemented such that the camera system includes a light source.

The system may be implemented such that the scans include a scattered light response.

The system may be implemented such that the scans include a LIDAR response.

The system may be implemented such that the part recognition module compares the received scans to a parts database.

The system may be implemented such that, based on the comparison, a make and model of vehicle associated with the part is identified.

The system may be implemented such that the job assignment module assigns the part to the outstanding repair job based on an analysis of outstanding repair jobs.

The system may be implemented such that the scan results include a barcode.

The system may be implemented such that the scan results include a vendor address.

The system may be implemented such that the scan results include text.

The system may be implemented such that the text includes an order receipt.

The system may be implemented such that the output generator communicates with a display or printer.

The system may be implemented such that it also includes a communication component that provides the part quality metric to a second source.

The system may be implemented such that the part quality metric is based on a communication received from the second source.

A method of validating a part is presented that includes receiving a part, scanning the part with an optical sensor, identifying the part, using a part identification module, based on the scan. Identifying includes the part identification module comparing the scan to a database of part information. The method also includes identifying a part defect, using a defect identification module, based on the comparison of the scan to the database of part information. The method also includes determining viability of the part based on the identified part defect. Determining viability includes outputting a repair recommendation, a use as-is recommendation, or a replace recommendation.

The method may be implemented such that receiving the part includes detecting the part on a receiving station.

The method may also include receiving an input.

The method may be implemented such that the input includes identifying part information.

The method may be implemented such that the identifying part information includes a part type.

The method may be implemented such that the part defect is a puncture, a hole, a bend, a crack, a dent, a discoloration, a rust spot, dirt or dust.

The method may be implemented such that determining viability includes generating a repair plan for the part.

The method may be implemented such that determining viability includes outputting a replace recommendation if the repair plan exceeds a threshold.

The method may be implemented such that the threshold is a cost threshold or a time threshold.

The method may be implemented such that it includes generating a repair estimate based on the repair plan.

The method may also include communicating the repair plan to a source.

The method may be implemented such that the repair recommendation is based on a response from the source.

The method may be implemented such that the repair plan is automatically communicated to the source once generated.

The method may be implemented such that the steps of identifying the part, identifying a part defect, and determining viability are completed automatically by a part validation system, in response to received scans from the optical sensor.

The method may be implemented such that it also includes associating the part with an outstanding repair job, based on the part identification.

The method may be implemented such that the identified part is a vehicle door, the detected defect is a discoloration, and the viability indication includes repairing the discoloration.

The method may be implemented such that the identified part is a vehicle door, the detected defect is a structural defect. The repair recommendation includes replacing the part.

The method may be implemented such that the identified part is an axle, the detected defect is a bend. The repair recommendation includes repairing the bend.

The method may be implemented such that determining viability includes comparing the detected defect to a defect tolerance.

The method may be implemented such that determining viability includes reviewing availability of a replacement part.

A part recognition module is presented that includes an image receiver that receives images from a camera. The module also includes a part identification module that analyzes the received images and, based on the analysis, identifies a vehicle part in the images. The module also includes a part quality evaluator that, based on the identified vehicle part, determines a part quality metric. The part quality metric includes a defect indication. The module also includes a communication module that communicates the part quality metric to a source. The module also includes a processing unit that causes the part identification module to analyze, the part quality evaluator to determine, and the communication module to communicate automatically in response to the received images.

The part recognition module may be implemented such that the part identification module, using the communication module, reviews a parts database to identify the vehicle part.

The part recognition module may be implemented such that the parts database is remote from the part recognition module. The communication component communicates using a wireless communication protocol.

The part recognition module may be implemented such that it includes a job identification module that, based on the vehicle part identification, searches an outstanding job list for a job requiring the identified part.

The part recognition module may be implemented such that the part quality metric is a part return metric if no job requires the identified part.

The part recognition module may be implemented such that it includes a part defect identifier that analyzes the received images and identifies a defect associated with the vehicle part.

The part recognition module may be implemented such that the defect is a puncture, a hole, a discoloration, a crack, a rust spot or dirt.

The part recognition module may be implemented such that the defect identifier assigns a severity to the identified defect.

The part recognition module may be implemented such that it also includes a recommendation module that, based on the identified defect and the identified severity, generates a repair plan.

The part recognition module may be implemented such that the repair plan is compared against a repair threshold and, a part quality metric of repairable is communicated if the repair plan is less than the threshold.

EXAMPLES

Example 1: Bent Axle

A part is received and imaged and identified as an axle for a 2012 Ford Taurus by a part identification module. A defect detection module detects that the axle is bent. The bend is detected to be about 30°. Based on severity indications, the part would be acceptable if repaired to a bend of less than 1°, with an allowable deviation of 0.15°. By referencing previous repair plans, it is estimated that the repair from a bend of 2° to 1° would take one hour. An inventory check was completed by checking inventory of nearby vendors, but no other parts were acceptable considering repair time constraints. The recommendation to repair the part was presented to the customer and accepted. The axle was repaired and then used as a replacement part.

Example 2: Dented Door

A part is received at a receiving station and identified as a passenger side door. A defect is detected and identified as a dent that is too severe, because of depth and aesthetic concerns, to be repaired. A recommendation is provided to return the door to the vendor.

Example 3: Cracked Bumper

A part is unwrapped and identified as a bumper. A crack is detected by a defect detector. Based on historic repair information, it is estimated that the repair will take 2 hours. Because the repair time is higher than one hour, the repair recommendation is to return the bumper.

In parallel, the repair option is submitted to an insurance company covering the cost of the repair, finding that due to cost flexibility, the repair is approved. An override is received and documented.

Example 4: Wrong Part

A part is received and unwrapped on a receiving station. The part is imaged and, after rust and dirt are discounted, is identified. A make and model are identified by comparison to a parts database. A search is conducted of a jobs database to associate the part with a job. No results are found. The part was a windshield washer reservoir, which showed as pending receipt for a vehicle of the same make and model, but a newer and incompatible year. A return recommendation is generated, and an order for the required part was re-submitted to the vendor. No defect detection is conducted.

What is claimed is:

1. A replacement part validation system, the system comprising:
    a scanning system that, using a scanner, scans a received part and provides the scan results of the received part;
    a part recognition module that, based on the received scan results of the received part, detects a part identification and generates a part quality metric;
    a job assignment module that correlates the received part to an outstanding repair job in a plurality of outstanding repair jobs;
    an output generator that outputs the outstanding repair job and the part quality metric; and
    a computing processor that, based on the received scanned results, actuates the part recognition module to review a database of parts and retrieve a most-likely match, and wherein the part quality metric is based on a comparison of the received part to the most-likely match, and wherein the computing processor causes the output generator to output the outstanding repair job and part quality metric to a source.

2. The system of claim 1 and further comprising:
    a defect detection module that, based on the received scan results, detects a defect,
    and wherein the detected defect is output as the part quality metric.

3. The system of claim 2, wherein the defect is a bend, a puncture, a hole, a dent, a discoloration, rust, or dirt.

4. The system of claim 2, wherein the defect detection module compares the defect to a plurality of severity factors, wherein the severity factors comprise part location, defect location, defect type, defect size, or part function. 5. The system of claim 2, wherein a part repair plan is generated for the part based on the detected defect.

5. The system of claim 4, wherein the part quality metric is a part repair recommendation, wherein the part repair recommendation is based on the repair plan having a repair time less than a threshold repair time.

6. The system of claim 1, wherein the part quality metric is a return recommendation based on the comparison to the severity factors.

7. The system of claim 1, wherein the part is scanned while on a part receiving station.

8. The system of claim 7, wherein the part receiving station is a mobile receiving station.

9. The system of claim 1, wherein the scans comprise images captured by a camera system.

10. The system of claim 1 wherein, based on the comparison, a make and model of vehicle associated with the part is identified.

11. A method of validating a part comprising:
receiving a part;
scanning the part with an optical sensor;
identifying the part, using a part identification module; based on the scan, wherein identifying comprises the part identification module comparing the scan to a database of part information;
identifying a part defect, using a defect identification module, based on the comparison of the scan to the database of part information; and
determining viability of the part based on the identified part defect, wherein determining viability comprises outputting a repair recommendation, a use as-is recommendation, or a replace recommendation.

12. The method of claim 11, wherein receiving the part comprises detecting the part on a receiving station.

13. The method of claim 12, and further comprising receiving input comprising identifying part information.

14. The method of claim 12, wherein the part defect is a puncture, a hole, a bend, a crack, a dent, a discoloration, a rust spot, dirt or dust.

15. The method of claim 11, wherein the identified part is a vehicle door, the detected defect is a discoloration, and the viability indication comprises repairing the discoloration.

16. The method of claim 11, wherein the identified part is a vehicle door, the detected defect is a structural defect, and wherein the repair recommendation comprises replacing the part.

17. The method of claim 11, wherein the identified part is an axle, the detected defect is a bend, and wherein the repair recommendation comprises repairing the bend.

18. A part recognition module comprising:
an image receiver that receives images from a camera;
a part identification module that analyzes the received images and, based on the analysis, identifies a vehicle part in the images;
a part quality evaluator that, based on the identified vehicle part, determines a part quality metric, and wherein the part quality metric comprises a defect indication;
a communication module that communicates the part quality metric to a source; and
a processing unit that causes the part identification module to analyze, the part quality evaluator to determine, and the communication module to communicate automatically in response to the received images.

19. The part recognition module of claim 18, and further comprising a job identification module that, based on the vehicle part identification, searches an outstanding job list for a job requiring the identified part.

20. The part recognition module of claim 18, and further comprising a part defect identifier that analyzes the received images and identifies a defect associated with the vehicle part, wherein the defect is a puncture, a hole, a discoloration, a crack, a rust spot or dirt.

* * * * *